United States Patent
Massam et al.

(10) Patent No.: US 7,176,165 B2
(45) Date of Patent: *Feb. 13, 2007

(54) METHOD OF DRILLING USING A SIZED BARITE AS A WEIGHTING AGENT FOR DRILLING FLUIDS

(75) Inventors: Jarrod Massam, Aberdeen (GB); Neale Browne, Houston, TX (US); Mukesh Kapilla, The Woodlands, TX (US)

(73) Assignee: M-I L.L.C., Houston, TX (US)

(\*) Notice: Subject to any disclaimer, the term of this patent is extended or adjusted under 35 U.S.C. 154(b) by 0 days.

This patent is subject to a terminal disclaimer.

(21) Appl. No.: 11/145,054

(22) Filed: Jun. 3, 2005

(65) Prior Publication Data

US 2005/0277552 A1    Dec. 15, 2005

Related U.S. Application Data

(60) Provisional application No. 60/576,420, filed on Jun. 3, 2004.

(51) Int. Cl.
  C09K 8/03    (2006.01)
(52) U.S. Cl. .................................. 507/140; 507/906
(58) Field of Classification Search ............... 507/140, 507/906
  See application file for complete search history.

(56) References Cited

U.S. PATENT DOCUMENTS 2,003,701 A    6/1935   Stinson
2,363,499 A    11/1944  Campbell
2,455,188 A    11/1948  Oxford
2,830,948 A    4/1958   Popham
3,065,172 A    11/1962  Groves (Continued)

FOREIGN PATENT DOCUMENTS

EP    0 119 745 A2    9/1984

(Continued)

OTHER PUBLICATIONS

Ormsby, George S., "Understanding Solids Control Improves Drilling Efficiency", Pet. Eng. Int., Dec. 1981, p. 120-130.

(Continued)

*Primary Examiner*—Philip C. Tucker
(74) *Attorney, Agent, or Firm*—M-I L.L.C.; Carter J. White

(57) ABSTRACT

An additive that increases the density of fluids containing a sized barite weighting agent. The wellbore fluid has rheological properties comparable to a conventional wellbore fluids but does not exhibit problems with sag and resulting variations in density. An illustrative embodiment is directed to a method for making the sized barite weighting agent and a method for using such sized barite weighting agent in a wellbore fluid. In one preferred embodiment the sized barite weighting agent has a particle diameter between 4 μm to 15 μm In another preferred embodiment, the additive has a $D_{50}$ (by weight) of approximately 1 μm to 6 μm. In another preferred embodiment the additive has a $D_{90}$ (by weight) of approximately 4 μm to 8 μm. The additive may be used in any wellbore fluid such as drilling, cementing, completion, packing, work-over (repairing), stimulation, well killing, and spacer fluid.

7 Claims, 1 Drawing Sheet

U.S. PATENT DOCUMENTS

| | | | |
|---|---|---|---|
| 3,408,296 A | 10/1968 | Kuhn | |
| 3,622,513 A | 11/1971 | Miller | |
| 3,625,892 A | 12/1971 | Watanabe | |
| 3,684,709 A | 8/1972 | Smith | |
| 3,766,997 A | 10/1973 | Heilhecker et al. | |
| 4,046,197 A | 9/1977 | Gruesbeck, Jr. et al. | |
| 4,141,843 A * | 2/1979 | Watson | 507/207 |
| 4,175,042 A | 11/1979 | Mondshine | |
| 4,217,229 A | 8/1980 | Watson | |
| 4,230,586 A | 10/1980 | Bretz | |
| 4,369,843 A | 1/1983 | Mondshine | |
| 4,405,468 A | 9/1983 | Haun, Jr. | |
| 4,519,922 A | 5/1985 | Sutton | |
| 4,584,327 A | 4/1986 | Sutton | |
| 4,689,161 A | 8/1987 | Blumenthal et al. | |
| 4,696,353 A * | 9/1987 | Elmquist et al. | 175/206 |
| 4,822,500 A | 4/1989 | Dobson, Jr. et al. | |
| 5,007,480 A | 4/1991 | Anderssen | |
| 5,110,484 A | 5/1992 | Sheu et al. | |
| 5,145,256 A | 9/1992 | Wiemers et al. | |
| 5,327,968 A | 7/1994 | Onan et al. | |
| 5,361,631 A | 11/1994 | Covington et al. | |
| 5,415,228 A | 5/1995 | Price | |
| 5,504,062 A | 4/1996 | Johnson | |
| 5,518,996 A | 5/1996 | Maroy | |
| 5,585,333 A | 12/1996 | Dahl et al. | |
| 5,629,271 A | 5/1997 | Dobson, Jr. | |
| H1685 H | 10/1997 | Lau et al. | |
| 5,792,727 A | 8/1998 | Jacobs | |
| 5,807,810 A | 9/1998 | Blezard et al. | |
| 5,826,669 A | 10/1998 | Zaleski | |
| 5,910,467 A | 6/1999 | Bragg | |
| 5,948,733 A | 9/1999 | Cawiezel | |
| 5,962,375 A | 10/1999 | Sawdon et al. | |
| 6,054,416 A | 4/2000 | Bland | |
| 6,153,562 A | 11/2000 | Villar | |
| 6,180,573 B1 * | 1/2001 | Nattier et al. | 507/269 |
| 6,194,355 B1 | 2/2001 | Jarrett et al. | |
| 6,204,224 B1 | 3/2001 | Quintero et al. | |
| 6,248,698 B1 | 6/2001 | Mullen | |
| 6,284,714 B1 | 9/2001 | Bland et al. | |
| 6,290,001 B1 | 9/2001 | West | |
| 6,380,136 B1 | 4/2002 | Bates | |
| 6,403,537 B1 | 6/2002 | Chesser et al. | |
| 6,548,452 B1 | 4/2003 | Nattier | |
| 6,576,597 B2 * | 6/2003 | Dobson et al. | 507/111 |
| 6,586,372 B1 * | 7/2003 | Bradbury et al. | 507/140 |
| 6,764,980 B2 | 7/2004 | Bates | |
| 6,770,602 B2 | 8/2004 | Patel | |
| 6,887,832 B2 | 5/2005 | Kirsner | |
| 6,931,916 B2 | 8/2005 | Zamora | |
| 2003/0036484 A1 | 2/2003 | Kirsner | |
| 2003/0064897 A1 | 4/2003 | Kirsner | |
| 2003/0144153 A1 | 7/2003 | Kirsner | |
| 2003/0158046 A1 | 8/2003 | Patel et al. | |
| 2003/0176292 A1 | 9/2003 | Rayborn | |
| 2003/0203822 A1 | 10/2003 | Bradbury | |
| 2004/0127366 A1 | 7/2004 | Bradbury | |
| 2005/0049147 A1 | 3/2005 | Patel | |
| 2005/0101492 A1 | 5/2005 | Bradbury | |
| 2005/0101493 A1 | 5/2005 | Bradbury | |

FOREIGN PATENT DOCUMENTS

| | | | |
|---|---|---|---|
| EP | 0 621 330 A1 | | 10/1994 |
| EP | 0 673 985 A1 | | 9/1995 |
| EP | 0 786 507 A1 | | 7/1997 |
| GB | 1495874 | | 12/1977 |
| GB | 2 005 412 A | | 3/1981 |
| GB | 2066876 | | 7/1981 |
| GB | 2216511 | | 10/1989 |
| GB | 2277543 | | 11/1994 |
| WO | WO 85/05118 | | 11/1985 |
| WO | WO97/45625 | | 12/1997 |
| WO | WO 98/03609 | * | 1/1998 |

OTHER PUBLICATIONS

Rogers, Walter F., "Composition and Properties of Oil Well Drilling Fluids", 4th Ed. Gulf Publishing, 1980 p. 8-11.

Rogers, Walter F., "Composition and Properties of Oil Well Drilling Fluids", 4th Ed. Gulf Publishing, 1953, p. 148-151.

Malachosky, Ed, "Hematite Adds Weight to Fluid Additive Controversy", Pet. Eng. Int., Jul. 1986, p. 40-43.

Walker, C.O., "Alternative Weighting Material", J. Pet. Tech., Sep. 1985, p. 2158-2164.

Mohnot, Shantilal, "Characterization and Control of Fine Particles Involved in Drilling", J. Pet. Tech., Sep. 1985, p. 1622-1632.

Hayatdavoudi, A., "Drilling with a One-Step Solids Control Technique", SPE Drilling Eng., Mar. 1989, p. 31-40.

"Specification for Drilling-Fluid Materials" API Specification 13A, Jul. 2004, p. 15-24.

"Recommended Practice Standard Proceedure for Laboratory Testing Drilling Fluids" API Recommended Paractice 13I, 5th Ed. Jun. 1995, p. 6-7.

API Committe RP 13A Report, 1984, p. 19.

API Task Group on Barite Report, 1985, p. 23-25.

S.B. Randolph, et al., "Use of a Unique Weighting Agent for Slimhole Drilling"; SPE 24595; Oct. 1992; pp. 517-526.

Dave Marshall et al. "Fluid weighting material yeilds low ECD while reducing sag tendencies"; World Oil, Jun. 2004, pp. 47-48 and 50.

Cor Oldenziel et al.; "An Alternative to Heavy Brines"; Product literature from Elkem website; www.materials.elkem.com; Date: unknown.

Elkem Asa; Safety Data Sheet for MicroMax; Jun. 24, 2003; Product literature from Elkem website; www.materials.elkem.com.

Elkem Asa; "What is MicroMax?" Product literature from Elkem website; www.materials.elkem.com; Date: unknown.

Elkem Asa; "Micromax Used in oil-Based Mud in UK Sector of North Sea" Product literature from Elkem website; www.materials.elkem.com; Date: unknown.

Elkem Asa; Safety Data Sheet of MicroMax F; Sep. 3, 2004; Product literature from Elkem website; www.materials.elkem.com; Date: unknown.

Elkem Asa; "Facing the Unpredictable?" Product literature from Elkem website; www.materials.elkem.com; Date: unknown.

Elkem Asa; "MicroMax - Superior fluid properties for demanding well"; Product literature from Elkem website; www.materials.elkem.com; Date: unknown.

Elkem Asa; "MicroMax - High Density cement"; Product literature from Elkem website; www. materials.elkem.com; Date: unknown.

Elkem Asa; "MicroMax - Low viscosity spacer" Product literature from Elkem website; www.materials.elkem.com; Date: unknown.

Elkem Asa; "MicroMax FF; Developed for your convenience" Product literature from Elkem website; www.materials.elkem.com; Date: Oct. 23, 2005.

* cited by examiner

METHOD OF DRILLING USING A SIZED BARITE AS A WEIGHTING AGENT FOR DRILLING FLUIDS

This application claims the benefit of U.S. Provisional Application No. 60/576,420 filed Jun. 3, 2004, incorporated herein by reference.

BACKGROUND

A wellbore fluid serves many important functions throughout the process in drilling for oil and gas. One such function is cooling and lubricating the drill bit as it grinds though the earth's crust. As the drill bit descends, it generates "cuttings," or small bits of stone, clay, shale, or sand. A wellbore fluid serves to transport these cuttings back up to the earth's surface. As drilling progresses, large pipes called "casings" are inserted into the well to line the borehole and provide stability. One of skill in the art should appreciate that these uncased sections of the borehole, which are exposed to the high pressures of the reservoir, must be stabilized before casing can be set; otherwise, a reservoir "kick" or, in the extreme case, a "blowout"—a catastrophic, uncontrolled inflow of reservoir fluids into the wellbore—may occur. A wellbore fluid, if monitored properly, can provide sufficient pressure stability to counter this inflow of reservoir fluids.

A critical property differentiating the effectiveness of various wellbore fluids in achieving these functions is density, or mass per unit volume. The wellbore fluid must have sufficient density in order to carry the cuttings to the surface. Density also contributes to the stability of the borehole by increasing the pressure exerted by the wellbore fluid onto the surface of the formation downhole. The column of fluid in the borehole exerts a hydrostatic pressure (also known as a head pressure) proportional to the depth of the hole and the density of the fluid. Therefore, one can stabilize the borehole and prevent the undesirable inflow of reservoir fluids by carefully monitoring the density of the wellbore fluid to ensure that an adequate amount of hydrostatic pressure is maintained.

It has been long desired to increase the density of wellbore fluids, and, not surprisingly, a variety of methods exist. One method is adding dissolved salts such as sodium chloride, calcium chloride, and calcium bromide in the form of an aqueous brine to wellbore fluids. Another method is adding inert, high-density particulates to wellbore fluids to form a suspension of increased density. These inert, high-density particulates often are referred to as "weighting agents" and typically include powdered minerals of barite, calcite, or hematite.

Naturally occurring barite (barium sulfate) has been utilized as a weighting agent in drilling fluids for many years. Drilling grade barite is often produced from barium sulfate containing ores either from a single source or by blending material from several sources. It may contain additional materials other than barium sulfate mineral and thus may vary in color from off-white to grey or red brown. The American Petroleum Institute (API) has issued international standards to which ground barite must comply. These standards can be found in API Specification 13A, Section 2.

Other materials, such as finely divided metals have been used as weighting agents for wellbore fluids, such as found in PCT Patent Application WO085/05118, which discloses using iron ball-shaped particles having a diameter less than 250 µm and preferably between 15 and 75 µm, and calcium carbonate and iron carbonate, as disclosed in U.S. Pat. No. 4,217,229, have also been proposed as weighting agents.

It is known in the art that during the drilling process weighting agents, as well as cuttings, can create sedimentation or "sag" that can lead to a multitude of well-related problems such as lost circulation, loss of well control, stuck pipe, and poor cement jobs. The sag phenomenon arises from the settling out of particles from the wellbore fluid. This settling out causes significant localized variations in mud density or "mud weight," both higher and lower than the nominal or desired mud weight. The phenomenon generally arises when the wellbore fluid is circulating bottoms-up after a trip, logging or casing run. Typically, light mud is followed by heavy mud in a bottoms-up circulation.

Sag is influenced by a variety of factors related to operational practices or drilling fluid conditions such as: low-shear conditions, drillstring rotations, time, well design, drilling fluid formulation and properties, and the mass of weighting agents. The sag phenomenon tends to occur in deviated wells and is most severe in extended-reach wells. For drilling fluids utilizing particulate weighting agents, differential sticking or a settling out of the particulate weighting agents on the low side of the wellbore is known to occur.

Particle size and density determine the mass of the weighting agents, which in turn correlates to the degree of sag. Thus it follows that lighter and finer particles, theoretically, will sag less. However, the conventional view is that reducing weighting agent particle size causes an undesirable increase in the fluid's viscosity, particularly its plastic viscosity. Plastic viscosity is generally understood to be a measure of the internal resistance to fluid flow that may be attributable to the amount, type or size of the solids present in a given fluid. It has been theorized that this increase in plastic viscosity attributable to the reduction in particle size—and thereby increasing the total particle surface area—is caused by a corresponding increase in the volume of fluids, such as water or drilling fluid, adsorbed to the particle surfaces. Thus, particle sizes below 10 µm have been disfavored.

Because of the mass of the weighting agent, various additives are often incorporated to produce a rheology sufficient to allow the wellbore fluid to suspend the material without settlement or "sag" under either dynamic or static conditions. Such additives may include a gelling agent, such as bentonite for water-based fluid or organically modified bentonite for oil-based fluid. A balance exists between adding a sufficient amount of gelling agent to increase the suspension of the fluid without also increasing the fluid viscosity resulting in reduced pumpability. One may also add a soluble polymer viscosifier such as xanthan gum to slow the rate of sedimentation of the weighting agent.

Various approaches exist in the art to provide a wellbore fluid with the desired density with a minimum impact on its fluid properties, or "rheology." One approach has been disclosed in U.S. Pat. No. 6,180,573 which involved purposefully removing some or all of the finest particles from a ground barite (i.e. particles below 6 µm), and then monitoring and maintaining the selected particle size by adding coarser material as the particle size degrades during use.

It is worth noting that, despite the general industry disfavor, other approaches have used small particles as weighting agents. One approach, disclosed in U.S. Pat. No. 5,007,480, uses manganomanganic oxide ($Mn_3O_4$) having a particle size of at least 98% below 10 µm in combination with conventional weighting agents such as API grade barite, which results in a drilling fluid of higher density than that obtained by the use of barite or other conventional weighting agents alone. Another approach is disclosed in EP-A-119 745, which describes an ultra high-density fluid for blowout prevention comprised of water, a first and possible second weighting agent, and a gellant made of fine particles of average diameter between 0.5 and 10 μm. The gelling agent particles are small enough to impart good static gel strength to the fluid by virtue of interparticle attractive forces. Yet another approach is disclosed in U.S. Patent Application 20040127366, the specification of which is incorporated by reference herein, which discloses a weighting agent having a weight average particle diameter of less than 1.5 μm and coated with a dispersant for controlling the interparticle interactions, thereby minimizing any increase in viscosity incurred by the use of SIZED particles.

The need exists to provide a high-density fluid that has an improved sag performance as compared to conventional fluids, while maintaining comparable rheological properties.

SUMMARY

An illustrative embodiment of the claimed subject matter is generally directed to an sized weighting agent and a wellbore fluid containing such sized weighting agent that has an increased density with improved suspension stability without a significant viscosity increase such that the wellbore fluid has rheological properties comparable to a conventional wellbore fluid. An illustrative embodiment of the claimed subject matter is further directed to a method for making the sized weighting agent and a method for using such sized weighting agent in a wellbore fluid. In one illustrative embodiment the sized barite weighting agent has a particle size distribution such that at least 90% by volume of the measured particle diameter is between about 4 μm and about 20 μm and preferably is in the range of about 8 μm to about 16 μm. In another illustrative embodiment, the sized barite weighting agent includes at least 50% by volume particles is preferably in the range of about 1 μm to about 10 μm. and preferably in the range of about 4 μm to about 8 μm.

BRIEF DESCRIPTION OF THE DRAWING

The following Description of Illustrative Embodiments makes reference to the following drawings.

DESCRIPTION OF ILLUSTRATIVE EMBODIMENTS

Figure 1:
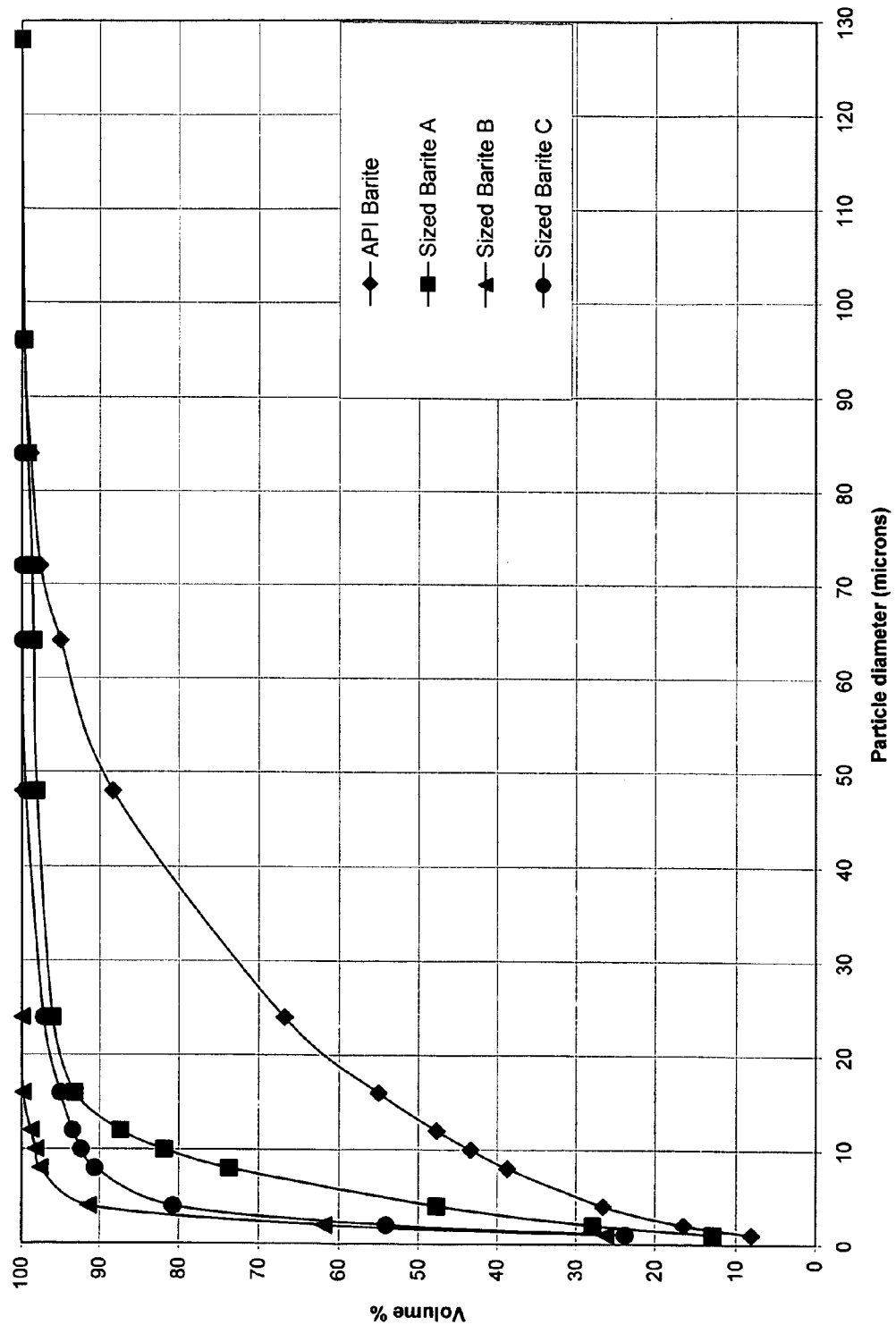
FIG. 1 Graphically shows the particle size distributions of API barite and a barite ground in accordance with the teachings of the present invention.

Contrary to conventional belief, using sized barite weighting agent in the formulation of a wellbore fluid results in rheological properties no less favorable than when using coarser barite weighting material. The fluid formulation techniques as found in the normal practice of fluid formulations would not generally change. One would still need to adjust the amounts of dispersants added depending on the mud weight and density of the fluid and rheological profile that was required in order to achieve a suitable mud formulation. One of skill in the art would appreciate the surprising results demonstrating that wellbore fluids containing sized barite weighting agents as described herein actually provide superior sag performance to wellbore fluids formulated with the well-known coarser barite weighting agents. One of skill in the art would further appreciate the surprising results as described herein that the wellbore fluid containing sized barite weighting agents has no appreciable difference in rheologies as compared to wellbore fluids formulated with well-known coarser barite weighting agents. In particular, it has been unexpectedly and surprisingly found that a sized barite weighting agent generates high-density suspensions or slurries without the expected increase in plastic viscosity previously associated with using finely ground weighting agent particles.

As previously reported in the art, decreasing barite weighting agent particle sizes were thought to increase the viscosity of the fluid, such as reported in "Drilling and Drilling Fluids," Chilingarian G. V. and Vorabutor P. 1981, pages 441–444. The reasoning follows, small particles will adsorb significantly more fluid than larger particles due to their higher surface area-to-volume ratio, and because of this higher adsorption of fluid to the surface of the particle, an increase in the viscosity (that is, a decrease in the fluidity) of the wellbore fluid is observed. Thus, one of skill in the art should understand that it has generally been desirable to eliminate fine barite particles in order to reduce fluid viscosity. This approach to controlling rheology has been disclosed in U.S. Pat. Nos. 6,180,573 and 6,548,452.

However, wellbore fluids with coarser, larger-sized barite weighting agents are generally formulated with higher rheologies than desired in order to overcome the problematic issue of barite sag. TABLE 1 shows a typical prior art invert emulsion drilling fluid formulation that includes an emulsifier(s), organoclay, lime, and fluid loss additives. As shown in TABLE 1, an internal brine phase is emulsified into a continuous oil phase by means of a suitable emulsifier package. The volume of weighting agent can be adjusted to produce fluids with a range of densities and, although a preferred weighting agent is barite, it is feasible to manufacture drilling or other wellbore fluids with other known minerals such as calcium carbonate, hematite, or ilmenite. As demonstrated in TABLE 1, various additives typically are used in order to produce the necessary rheological and filtration characteristics for the drilling fluid to perform its functions. In particular, the rheology must be adequate to allow the fluid to suspend the dense weighting agent without settlement or "sag" under either dynamic or static conditions. A typical, non-limiting range of mud weight (MW) is 10–19 lb/gal and an oil to water ratio (OWR) is 60/40 to 95/5.

TABLE 1

(Prior Art)
Typical Invert Emulsion Drilling Fluid Formulation

| Product | Typical pounds/barrel |
|---|---|
| Base oil | As required |
| Weight Material (i.e. Barite) | As required |
| Emulsifier/s | 10–20 |
| Organoclay | 2–8 |
| Lime | 4–10 |
| Brine | As required |
| Fluid Loss Additive | 1–5 |

However, the disclosure herein demonstrates that, contrary to conventional wisdom, one may not need to formulate a wellbore fluid with higher rheologies than desired to counter the problem of sag. Instead, the sized barite weighting agent as disclosed herein may be used with no significant difference in rheology from a drilling fluid using a known coarser ground material. And by using a sized barite weighting agent, the particles remain in suspension and therefore provide a superior sag performance. In view of the art above, one of skill in the art should immediately appreciate the surprising and significant results contained herein, which utilizes barite particles ground to a particle size distribution such that at least 90% of the cumulative volume of the measured particle diameters ($d_{90}$) is between about 4 μm and about 20 μm and includes at least 50% of the cumulative volume of the measured particle diameters ($d_{50}$) is preferably in the range of about 1 μm to about 10 μm. As illustrated below such a wellbore fluid exhibits a reduced plastic viscosity while at the same time both greatly reducing sedimentation or sag and maintaining comparable rheologies to other conventional wellbore fluids.

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low permeability filter cake that seals openings in formations penetrated by the bit and act to reduce the unwanted influx of formation fluids from permeable rocks.

Drilling fluids are typically classified according to their base material. In oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase.

Invert emulsion fluids, i.e. emulsions in which a non-oleaginous fluid is the discontinuous phase and an oleaginous fluid is the continuous phase, are employed in drilling processes for the development of oil or gas sources, as well as, in geothermal drilling, water drilling, geoscientific drilling and mine drilling. Specifically, the invert emulsion fluids are conventionally utilized for such purposes as providing stability to the drilled hole, forming a thin filter cake, lubricating the drilling bore and the downhole area and assembly, and penetrating salt beds without sloughing or enlargement of the drilled hole.

Oil-based drilling fluids are generally used in the form of invert emulsion muds. An invert emulsion mud consists of three-phases: an oleaginous phase, a non-oleaginous phase and a finely divided particle phase. Also typically included are emulsifiers and emulsifier systems, weighting agents, fluid loss additives, viscosity regulators and the like, for stabilizing the system as a whole and for establishing the desired performance properties. Full particulars can be found, for example, in the article by P. A. Boyd et al entitled "New Base Oil Used in Low-Toxicity Oil Muds" in the Journal of Petroleum Technology, 1985, 137 to 142 and in the Article by R. B. Bennet entitled "New Drilling Fluid Technology-Mineral Oil Mud" in Journal of Petroleum Technology, 1984, 975 to 981 and the literature cited therein. Also reference is made to the description of invert emulsions found in Composition and Properties of Drilling and Completion Fluids, 5th Edition, H. C. H. Darley, George R. Gray, Gulf Publishing Company, 1988, pp. 328–332, the contents of which are hereby incorporated by reference.

As used herein the term "oleaginous liquid" means oil which is a liquid at 25.degree. C. and immiscible with water. Oleaginous liquids typically include substances such as diesel oil, mineral oil, synthetic oil such as polyolefins or isomerized polyolefins, ester oils, glycerides of fatty acids, aliphatic esters, aliphatic ethers, aliphatic acetals, or other such hydrocarbons and combinations of these fluids. In one illustrative embodiment of this invention the oleaginous liquid is an polyolefin material which provides environmental degradability to the overall drilling fluid. Such polyolefins should be selected such that the molecular weight permits for a functional invert emulsion drilling fluid to be formulated. Especially preferred are isomerized polyolefins having a carbon backbone of 16 to 18 carbons and in which at least one point of unstaturation is internal.

The amount of oleaginous liquid in the invert emulsion fluid may vary depending upon the particular oleaginous fluid used, the particular non-oleaginous fluid used, and the particular application in which the invert emulsion fluid is to be employed. However, generally the amount of oleaginous liquid must be sufficient to form a stable emulsion when utilized as the continuous phase. Typically, the amount of oleaginous liquid is at least about 30, preferably at least about 40, more preferably at least about 50 percent by volume of the total fluid.

As used herein, the term "non-oleaginous liquid" mean any substance which is a liquid at 25.degree. C. and which is not an oleaginous liquid as defined above. Non-oleaginous liquids are immiscible with oleaginous liquids but capable of forming emulsions therewith. Typical non-oleaginous liquids include aqueous substances such as fresh water, seawater, brine containing inorganic or organic dissolved salts, aqueous solutions containing water-miscible organic compounds and mixtures of these. In one illustrative embodiment the non-oleaginous fluid is brine solution including inorganic salts such as calcium halide salts, zinc halide salts, alkali metal halide salts and the like.

The amount of non-oleaginous liquid in the invert emulsion fluid may vary depending upon the particular non-oleaginous fluid used and the particular application in which the invert emulsion fluid is to be employed. Typically, the amount of non-oleaginous liquid is at least about 1, preferably at least about 3, more preferably at least about 5 percent by volume of the total fluid. Correspondingly, the amount should not be so great that it cannot be dispersed in the oleaginous phase. Therefore, typically the amount of non-oleaginous liquid is less than about 90, preferably less than about 80, more preferably less than about 70 percent by volume of the total fluid.

According to a preferred embodiment, an additive of solid sized barite particles or sized weighting agents is added to a wellbore fluid. This generates a high density suspension with superior sag performance. One of skill in the art would understand that in addition to the sized particle weighting agents disclosed herein, one may add any of the known drilling or other wellbore fluid formulation additives such as emulsifiers, dispersants, oil-wetters, water-wetters, foamers and defoamers to the fluid depending on the particular fluid requirements and rheologies desired.

A drilling fluid is typically designed based on a number of technical performance and cost factors. The subject matters disclosed herein enables the fluid to be tailored to suit the rheological and sag properties as well as the cost element. The data reported herein shows that the rheology of the drilling fluid is largely unaffected by the introduction of sized barite weight material and that the sag performance of the fluid is directly related to the particle size of the weight material used.

As previously noted although a preferred weighting agent is barite a naturally occurring mineral composed primarily of barium sulfate. Naturally occurring barite (barium sulfate) has been utilized as a weighting agent in drilling fluids for many years. Drilling grade barite is often produced from barium sulfate containing ores either from a single source or by blending material from several sources. It may contain additional materials other than barium sulfate mineral and thus may vary in color from off-white to grey or red brown. The American Petroleum Institute (API) has issued international standards to which ground barite must comply. These standards can be found in API Specification 13A, Section 2.

It is feasible to manufacture drilling or other wellbore fluids with other known minerals such as calcite (calcium carbonate), hematite (iron oxides), or ilmenite. According to a preferred illustrative embodiment, the weighting agent is formed of solid particles that are composed of a material having a specific gravity of at least 4.2. This allows a wellbore fluid to be formulated to meet most density requirements yet have a particulate volume fraction low enough for the fluid to remain pumpable.

According to one illustrative embodiment, the weight average particle diameter of the weighting agent measures approximately 4 μm to 15 μm. In another illustrative embodiment, the weighting agent includes at least 50% by weight particles in the range of about 1 μm to about 5 μm. And in another illustrative embodiment, the weighting agent includes at least 90% by weight particles in the range of about 4 μm to about 8 μm. As shown in the examples below, use of these particle sizes enables one to achieve the objective of reducing sedimentation or sag potential without undesirably increasing the wellbore fluid viscosity.

According to another alternative illustrative embodiment the weighting agent is preferably barite and the sized barite weighting agent has a particle size distribution such that at least 90% by volume of the measured particle diameter is between about 4 μm and about 20 μm and preferably is in the range of about 8 μm to about 16 μm. In this illustrative embodiment, the sized barite weighting agent includes at least 50% by volume particles is preferably in the range of about 1 μm to about 10 μm. and preferably in the range of about 4 μm to about 8 μm.

It has been found that a predominance of particles that are too fine (i.e. below about 1 μm) results in the formation of a high rheology paste. Thus it has been unexpectedly found that the barite particles must be sufficiently small to avoid issues of barite sag and ECD, but not so small as to have an adverse impact on rheology. Thus barite particles meeting the particle size distribution criteria disclosed herein may be utilized without adversely impacting the Theological properties of the wellbore fluids. In one preferred and illustrative embodiment a barite weighting agent is sized such that: particles having a diameter less than 1 μm are 0 to 15% by volume; particles having a diameter between 1 μm and 4 μm are 15 to 40% by volume; particles having a diameter between 4 μm and 8 μm are 15 to 30 by volume; particles having a diameter between 8 μm and 12 μm are 5 to 15% by volume; particles having a diameter between 12 μm and 16 μm are 3 to 7% by volume; particles having a diameter between 16 μm and 20 μm are 0 to 10% by volume; particles having a diameter greater than 20 μm are 0 to 5% by volume. In another alternative illustrative embodiment, the barite weighting agent is sized so that the cumulative volume distribution is: <10% is less than 1 μm; <25% is in the range of 1 μm to 3 μm; <50% is in the range of 2 μm to 6 μm; <75% is in the range of 6 μm to 10 μm; <90% is in the range of 10 μm to 24 μm.

A person skilled in the art should immediately appreciate that the particle size distribution of the weighting agents disclosed herein is considerably finer than API barite. This is graphically shown in FIG. 1 which shows the particle distributions of API barite and a barite ground in accordance with the teachings of the present invention (Barite A).

One may obtain particles of the dimensions disclosed herein in several manners. One may purchase, commercially, these sized particles, such as for example, a suitable barite product having similar dimensions as disclosed herein. Of course, one may also obtain a coarser ground suitable material and then proceed to implement any known technique to further grind the material to the desired dimensions herein. Such techniques include jet-milling, high performance dry milling techniques, or any other technique that is known in the art generally for milling powdered products. In one preferred embodiment, appropriately sized particles of barite are selectively removed from the product stream of a convention barite grinding plant. This may include selectively removing the fines from a conventional API barite grinding operation. The fines are often considered a by-product of the grinding process and conventionally these materials are blended with courser materials to achieve API grade barite. However, in accordance with the present disclosure, these by-product fines may be further process via a air classifier to achieve the particle size distributions disclosed herein.

Given the particulate nature of the weighting agents disclosed herein, one of skill in the art should appreciate that additional components may be mixed with the weighting agent to modify various macroscopic properties. For example, anti-caking agents, lubricating agents, and agents used to mitigate moisture build-up may be included. Alternatively, solid materials that enhance lubricity or help control fluid loss may be added to the weighting agents of the present invention. In one illustrative examples, finely powdered natural graphite, petroleum coke, graphitized carbon or mixtures of these are added to enhance lubricity, rate of penetration and fluid loss as well as other properties of the drilling fluid. Another illustrative embodiment utilizes finely ground polymer materials to impart various characteristics to the drilling fluid. In instances where such materials are added, it is important to note that the volume of added material should not have an substantial adverse impact on the properties and performance of the drilling fluids. In one illustrative embodiment, polymeric fluid loss materials comprising less than 5% by weight are added to enhance the properties of the drilling fluid. Alternatively less than 5% by weight of suitably sized graphite and petroleum coke are added to enhance the lubricity and fluid loss properties of the fluid. Finally in another illustrative embodiment less than 5% by weight of a conventional anti-caking agent is added to assist in the bulk storage of the weighting materials.

The particulate materials as described herein may be added as a weighting agent in a dry form or concentrated as slurry in either an aqueous medium or as an organic liquid. As is known, an organic liquid should have the necessary environmental characteristics required for additives to oil-based drilling fluids. With this in mind it is preferred that the oleaginous fluid have a kinematic viscosity of less than 10 centistokes (10 $mm^2$/s) at 40° C. and, for safety reasons, a flash point of greater than 60° C. Suitable oleaginous liquids are for example diesel oil, mineral or white oils, n-alkanes or synthetic oils such as alpha-olefin oils, ester oils, mixtures of these fluids, as well as other similar fluids which should be well known to one of skill in the art of drilling or other wellbore fluid formulation. In one illustrative embodiment of the present subject matters disclosed herein, the desired particle size distribution is achieve via wet milling of the courser materials in the desired carrier fluid.

The particles as described herein may comprise one or a combination of several known weighting agents. In one illustrative embodiment, the weighting agent is selected from, but not limited to, barium sulphate (barite), calcium carbonate, dolomite, ilmenite, hematite or other iron ores, olivine, siderite, or strontium sulphate as well as combinations and mixtures of these and other weighting materials known to one of skill in the art. As one of skill in the art should realize, many factors may determine which weighting agent is most appropriate in any given set of circumstances. Factors such as cost, availability, density, size, or power required for grinding may influence the choice of product used.

The sized particles may further be used in any wellbore fluid such as drilling, cementing, completion, packing, work-over (repairing), stimulation, well killing, spacer fluids and other uses of high density fluids such as in a dense media separating fluid or in a ship's or other vehicle's ballast fluid. Such alternative uses, as well as other uses, of the present fluid should be apparent to one of skill in the art given the present disclosure.

The following examples are included to demonstrate illustrative embodiments of the claimed subject matter; they should not be construed as limiting the scope of the claimed subject matter or any claim thereof. Those of skill in the art should appreciate that the techniques disclosed in the examples that follow represent techniques discovered by the inventor to function well in the practice of the claimed subject matter, and thus can be considered to constitute preferred modes for its practice. However, in light of the present disclosure, those of skill in the art also should appreciate that many changes can be made in the specific disclosed embodiments that still obtain a like or similar result without departing from the scope of the claimed subject matter.

All testing was conducted in accordance with American Petroleum Institute (API) standards. Mixing was performed on a Silverson L2R Mixer or Hamilton Beach Mixer. The viscosity at various shear rates (in rotations per minute or rpm's) and other rheological properties were obtained using a Fann viscometer. Mud weights were checked using a standard mud scale or an analytical balance. Fluid loss was measured with a saturated API high-temperature high-pressure (HTHP) fluid loss cell. The particle size distributions of the samples were measured on a Malvern Mastersizer Microplus instrument (by weight measurements) or a Coulter LS230 (by volume measurements). Dynamic sag measurements were obtained using a Fann 35 viscometer with a sag shoe insert, such as disclosed in pending U.S. patent application Ser. No. 10/603,849, filed Jun. 25, 2003 and the publication entitled, "Improved Wellsite Test for Monitoring Barite Sag," AADE Drilling Fluids Conference, Houston, Tex., Apr. 6–7, 2004, both of which are incorporated by reference in their entireties. Of course, similar results would be obtained using Fann 35 viscometer without a sag shoe insert, and other known methods in the art for measuring viscosity values. After 30 minutes at a shear rate of 100 rpm at 120° F., measurements were obtained.

In expressing a metric equivalent, the following U.S. to metric conversion factors are used: 1 gal=3.785 liters; 1 lb.=0.454 kg; 1 lb/gal=0.1198 g/cm$^3$; 1 bbl—42 gal; 1 lb/bbl (ppb)=2.835 kg/m$^3$; 1 lb/100 ft$^2$=0.4788 Pa.

In the following illustrative examples, EXMPLE I, II and III, two weighting agents having different particle size characteristics were used in the formulation of three drilling fluids. Two of the drilling fluids have similar densities and compositions; the third drilling fluid has a density and composition specifically designed for HTHP application. A comparison of exemplary performance results for the coarser weighting agent and the sized weighting agent of one embodiment of the claimed subject matter is provided in TABLES 2–5 and summarized below.

EXAMPLE I

TABLES 2 and 3 show performance data obtained using substantially similar fluid formulations (MW 13.2 lb/gal and OWR 80/20) and two different barite weighting agents of varying particle size distribution (PSD), characterized as "coarser" and "ultra-fine." The coarser PSD is characterized by a $D_{50}$ (by weight) of 7 μm and $D_{90}$ (by weight) of 23 μm; the sized PSD is characterized by $D_{50}$ (by weight) of 3 μm and $D_{90}$ (by weight) of 6 μm, however, it should be clear that the sized PSD is not limited in any manner to these examples described herein.

The conventional performance data of TABLE 2 demonstrate that the rheology of the drilling fluid remains relatively constant regardless of whether the fluid is formulated with the coarser or finer barite. In other words, in surprising contrast to the conventional belief in the art, there is no dramatic increase in rheological effects due to the introduction of the sized particles and the concomitant increase in particle-particle interactions.

Additionally, suitable HTHP filtration properties (ml per 30 minutes), electrical stability, and gel strength, indicating a suitable mud formulation, were achieved with both the coarser and finer barite-containing fluids. Electrical Stability (ES) is a measure of the voltage required to break the emulsion and gives an indication of the stability of the drilling fluid. It is generally accepted that the higher the ES value, the more stable the fluid. Generally, an ES value of 500 or greater indicates a suitable stability. The ES data shown below indicates stable, well-emulsified fluids. The rheological property gel strength is measured when a fluid has been static and has had time to "relax". Gel strength measurements indicate whether particles within a fluid have formed an association, giving an indication as to the suitability of the mud formulation. High gel strength tends to be undesirable as it means greater shearing stress is necessary to deform the gel, while low gel strengths are also considered undesirable due to their poor affinity for solids bearing. The gel strengths shown are acceptable in that they are not very low and they are not progressive with time.

TABLE 2

Conventional Performance Data
Fluid 1: MW 13.2 lb/gal; OWR 80/20

| Weight Material | PSD (by weight) | Fluid | VG Fann35 Rheology at 120° F. Viscosity at various shear rates (rpm of agitation) | | | | | | 10'/10" Gel Strength (lb/100 ft$^2$) | ES (v) | HTHP @250° F. |
|---|---|---|---|---|---|---|---|---|---|---|---|
| | | | 600 | 300 | 200 | 100 | 6 | 3 | | | |
| Coarser Barite | $D_{50}$ - 7  $D_{90}$ - 23 | 1 | 46 | 29 | 23 | 16 | 7 | 5 | 7/10 | 686 | 3.2 |
| | | 2 | 66 | 39 | 29 | 19 | 7 | 6 | 8/12 | 790 | 0.8 |
| | | 3 | 58 | 35 | 27 | 19 | 7 | 6 | 7/11 | 684 | 2.4 |
| | | 4 | 51 | 30 | 23 | 15 | 6 | 5 | 8/8 | 683 | 2.8 |

TABLE 2-continued

Conventional Performance Data
Fluid 1: MW 13.2 lb/gal; OWR 80/20

| Weight Material | PSD (by weight) | Fluid | VG Fann35 Rheology at 120° F. Viscosity at various shear rates (rpm of agitation) | | | | | | 10'/10" Gel Strength (lb/100 ft$^2$) | ES (v) | HTHP @250° F. |
|---|---|---|---|---|---|---|---|---|---|---|---|
| | | | 600 | 300 | 200 | 100 | 6 | 3 | | | |
| Finer Barite | $D_{50}$ - 3  $D_{90}$ - 6 | 1 | 42 | 27 | 21 | 15 | 6 | 5 | 7/8 | 749 | 3.6 |
| | | 2 | 66 | 40 | 31 | 20 | 7 | 6 | 7/8 | 985 | 1.0 |
| | | 3 | 60 | 39 | 31 | 21 | 9 | 8 | 9/10 | 714 | 3.6 |
| | | 4 | 50 | 31 | 24 | 17 | 7 | 5 | 6/12 | 667 | 3.6 |

The data presented in TABLE 3 shows the sag benefits achievable with the finer barite exemplary of one embodiment of the claimed subject matter. Over a range of comparable rheologies, the dynamic and static sag performance of the fluid formulated with the sized weighting agent is superior to the fluid formulated with the coarser weighting agent. As shown on TABLE 3, use of the sized weighting agent results in (1) a lower density difference between the top and bottom of the fluid column, as demonstrated by a lower sag index during a static sag test, and (2) a much lower dynamic sag. This means that using an sized weighting agent, in this case barite, offers greater scope for fluid optimization in order to achieve both the desired sag and rheological properties.

TABLE 3

Sag Performance Data
Fluid 1: MW 13.2 lb/gal; OWR 80/20

| Weight Material | 3 rpm Rheology at 120° F. | Dynamic Sag at 120° F. (lb/gal change per 30 min) | Static Sag after 60 hrs at 250° F. | |
|---|---|---|---|---|
| | | | Sag Index | Free Oil (ml) |
| Coarser barite (by weight) $D_{50}$ = 7 $D_{90}$ = 23 | 3 | | 0.598 | 83 |
| | 3 | | 0.620 | 90 |
| | 6 | 0.99 | 0.552 | 28 |
| | 6 | 1.14 | 0.561 | 13 |
| | 5 | 1.34 | 0.550 | 5 |
| Finer barite (by weight) $D_{50}$ = 3 $D_{90}$ = 6 | 4 | 0.07 | 0.527 | 60 |
| | 4 | 0.00 | 0.546 | 44 |
| | 5 | 0.07 | 0.522 | 24 |
| | 8 | 0.09 | 0.520 | 14 |
| | 6 | 0.04 | 0.512 | 6 |

Upon consideration of the above data, one of skill in the art should appreciate that use of the finer barite resulted in an observable improvement in the sag index and a dramatic improvement in the dynamic sag potential with no appreciable change in rheological properties from those obtained using the coarser weighting agent. That is to say, the use of fine barite in and of itself provides a beneficial effect on the sag potential, both static and dynamic, of the drilling fluid. This is in stark contrast to what has been the prevalent view in the art on the use of finer particles in wellbore fluid weighting agents.

EXAMPLE II

TABLE 4 shows a similar set of data for another fluid having the same MW 13.2 lb/gal and OWR 80/20 as in Example I above. However, while the finer PSD remains at $D_{50}$ (by weight) of 3 μm and $D_{90}$ (by weight) of 6 μm, the coarser PSD is characterized by a larger diameter $D_{50}$ (by weight) of 9 μm and $D_{90}$ (by weight) of 38 μm.

In this case, as in Example I, the fluids were found to have similar rheological profiles, and there was no significant difference in the gel strengths observed. And in this case, as in Example I, the dynamic sag performance for the fluid containing the sized weighting agent significantly exceeds that performance of the fluid containing the coarser weighting agent.

TABLE 4

Conventional and Dynamic Sag
Performance Data
Fluid 2: MW 13.2 lb/gal; OWR 80/20

| Weight Material | PSD (by weight) | Fluid | VG Fann35 Rheology at 120° F. (rpm) Viscosity at various shear rates (rpm of agitation) | | | | | | 10'/10" Gel Strength (lb/100 ft$^2$) | Dynamic Sag (dMW) |
|---|---|---|---|---|---|---|---|---|---|---|
| | | | 600 | 300 | 200 | 100 | 6 | 3 | | |
| Coarser Barite | $D_{50}$ - 9  $D_{90}$ - 38 | Base | 56 | 34 | 27 | 18 | 8 | 7 | 7/10 | 3.17 |
| SIZED Barite | $D_{50}$ - 3  $D_{90}$ - 6 | Base | 52 | 34 | 27 | 19 | 9 | 8 | 8/12 | 0.08 |

EXAMPLE III

The exemplary data shown in TABLE 5 were obtained for a so-called HTHP drilling fluid formulation (MW 17 lb/gal and OWR 90/10) using the two different barite-weighting agents, identified as "coarser" and "finer." As in the preceding example, the coarser PSD is characterized by $D_{50}$ (by weight) of 9 μm and $D_{90}$ (by weight) of 38 μm, and the finer PSD is characterized by $D_{50}$ (by weight) of 3 μm and $D_{90}$ (by weight) of 6 μm. In this case, the effects of contamination are compared with both fluids. Generally, when a substance, such as clay, contaminates a wellbore fluid the rheology of the fluid greatly increases. As demonstrated in Table 5, the rheology of the fluid containing finer weight material does increase, but not significantly more than the fluid containing coarser weight material.

TABLE 5

Conventional and Dynamic Sag Performance Data
Fluid 3: MW 17 lb/gal; OWR 90/10

| Weight Material | PSD (by weight) | Fluid | VG Fann35 Rheology at 120° F. Viscosity at various shear rates (rpm of agitation) | | | | | | 10'/10" Gel Strength (lb/100 ft²) | Dynamic Sag (dMW) |
|---|---|---|---|---|---|---|---|---|---|---|
| | | | 600 | 300 | 200 | 100 | 6 | 3 | | |
| Coarser Barite | $D_{50}$ - 9  $D_{90}$ - 38 | Base | 79 | 42 | 31 | 20 | 7 | 6 | 7/21 | 2.22 |
| | | 20 ppb OCMA clay | 129 | 71 | 52 | 32 | 8 | 7 | 8/37 | |
| | | 10 v/v % Seawater | 140 | 83 | 63 | 40 | 13 | 9 | 12/33 | |
| Finer Barite | $D_{50}$ - 3  $D_{90}$ - 6 | Base | 66 | 39 | 29 | 19 | 7 | 6 | 10/18 | 0.02 |
| | | 20 ppb OCMA clay | 126 | 75 | 56 | 36 | 12 | 11 | 17/35 | |
| | | 10 v/v % Seawater | 102 | 64 | 49 | 34 | 13 | 12 | 16/30 | |

Once again, the data demonstrate very similar rheological properties for the two fluid formulations, even after the addition of non-reactive clay, which was used to simulate the contamination of drill solids and seawater. And once again, the data clearly show the superior dynamic sag performance achieved using the finer barite, rather than the conventionally employed coarser barite, as the weighting agent.

EXAMPLE IV

In the following illustrative example, drilling fluid were formulated utilizing commercially available API grade barite, a sized barite weighting agent in accordance with the present disclosure (Barite A), a sized barite weighting agent with a fine grind distribution (Barite B), and a polymer coated sized barite weighting agent (Barite C) made in accordance with the disclosure of published U.S. Application No. 20040127366 the contents of which are incorporated herein by reference.

The particle diameter distribution for each weighting agent was measured on a by volume basis and exemplary data is provided in FIG. 1. The fluids were formulated to minimize any differences in chemistry for formulation except for the weighting agent. All of the fluids had an identical Synthetic Oil (C16 to C18 internal olefin) to Water ratio of 80 to 20 and an overall density of 13 ppb. The following Table 6 provides the specifics of the fluid formulations:

TABLE 6

| Fluid Formulation | API Barite | Barite A | Barite B | Barite C |
|---|---|---|---|---|
| IO C16–C18 (base fluid) | As required | | | |
| VG PLUS, ppb | 1.70 | 1.70 | 1.70 | 1.70 |
| VG SUPREME, ppb | 0.80 | 0.80 | 0.80 | 0.80 |
| Lime, ppb | 3.0 | 3.0 | 3.0 | 3.0 |
| SUREMUL, ppb | 7.0 | 7.0 | 7.0 | 7.0 |
| SUREWET, ppb | 2.0 | 2.0 | 2.0 | 2.0 |
| Brine 25% wgt CaCl₂, ppb* | 18.04 | 18.04 | 18.04 | 11.95 |
| Water, bbl | 0.145 | 0.145 | 0.145 | 0.095 |
| ECOTROL, ppb | 0.50 | 0.50 | 0.50 | 0.50 |
| Weighting Agent, ppb | 283.01 | 283.01 | 283.01 | 375.98 |
| Drill solids, ppb** | 15.0 | 15.0 | 15.0 | 15.0 |

TABLE 6-continued

| Fluid Formulation | API Barite | Barite A | Barite B | Barite C |
|---|---|---|---|---|
| RHEFLAT, ppb | 1.25 | 1.25 | 1.25 | 1.25 |
| RHETHIK, ppb | 0.75 | 0.75 | 0.75 | 0.75 |

The base fluids were mixed in the order listed on a Silverson mixer at 6000 rpm over an hour while maintaining the temperature below 150° F.

In formulating the above fluids the following commercially available products all available from M-I SWACO, Houston Tex. were utilized:

| Material | |
|---|---|
| VG PLUS, ppb | Organophilic bentonite clay |
| VG SUPREME, ppb | Organophilic bentonite clay |
| SUREMUL, ppb | Fatty acid based emulsifier |
| SUREWET, ppb | Amido-amine based wetting agent |
| ECOTROL, ppb | Polymeric fluid lose control agent |
| RHEFLAT, ppb | Proprietary mixture of poly fatty acids |
| RHETHIK, ppb | Polymeric Thickening agent |

The simulated drill solids used were from Petrohunt, Marcantal #1-LM# 20043541. The solids were ground up and used in lieu of lab contaminates such as Rev Dust or OCMA Clay.

It should be noted that attempts to formulate a drilling fluid utilizing Barite B were unsuccessful and resulted in a fluid having paste like consistency. Thus it was not possible to obtain meaningful rheological properties. One of skill in the art would immediately understand and appreciate that such a formulation is not useful as a wellbore fluid using current state of the art drilling practices and methods.

The following Table 7 provides exemplary rheological data for each mud formulation.

A sample of each initial mud formulation was contaminated with an additional 3% drill solids mixed on a Hamilton Beach mixer. The simulated drill solids used were from Petrohunt, Marcantal #1-LM# 20043541. The solids were ground up and used in lieu of lab contaminates such as Rev

TABLE 7

Initial Rheology

| Mud Properties | API Barite Initial | | | Barite A | | | Barite C | | |
|---|---|---|---|---|---|---|---|---|---|
| Oil:Water Ratio | 80:20 | | | 80:20 | | | 80:20 | | |
| Mud Weight, ppg | 13.0 | | | 13.0 | | | 13.0 | | |
| Rheo Temp, ° F. | 40 | 100 | 150 | 40 | 100 | 150 | 40 | 100 | 150 |
| 600 rpm | 118 | 72 | 58 | 120 | 74 | 58 | 140 | 65 | 48 |
| 300 rpm | 69 | 45 | 39 | 72 | 49 | 40 | 80 | 40 | 30 |
| 200 rpm | 51 | 35 | 30 | 55 | 40 | 35 | 56 | 30 | 23 |
| 100 rpm | 32 | 24 | 21 | 32 | 30 | 27 | 33 | 18 | 15 |
| 6 rpm | 11 | 12 | 11 | 16 | 17 | 17 | 5 | 4 | 4 |
| 3 rpm | 10 | 11 | 11 | 16 | 17 | 17 | 4 | 4 | 4 |
| PV, cps | 49 | 27 | 19 | 48 | 25 | 18 | 60 | 25 | 18 |
| YP, lbs/100 ft$^2$ | 20 | 18 | 20 | 24 | 24 | 22 | 20 | 15 | 12 |
| 10 Second Gel | 12 | 13 | 13 | 19 | 20 | 18 | 4 | 3 | 4 |
| 10 Minute Gel | 39 | 31 | 36 | 36 | 40 | 33 | 37 | 30 | 36 |
| HTHP @ 250° F., ml | 3.4 | | | 3.6 | | | 4.0 | | |
| E.S., Vts @ 120° F. | 782 | | | 891 | | | 1060 | | |

A sample of each initial mud formulation was subjected rolling heat aging at 150 F for 16 hours. The following Table 8 provides exemplary rheological data for each mud formulation.

Dust or OCMA Clay. These fluids were subjected rolling heat aging at 150 F for 16 hours. The following Table 9 provides exemplary Theological data for each mud formulation.

TABLE 8

Rheology After Dynamic (Rolling) Heat Aging at 150° F. for 16 hours

| Mud Properties | API Barite AHR | | | Barite A | | | Barite C | | |
|---|---|---|---|---|---|---|---|---|---|
| Oil:Water Ratio | 80:20 | | | 80:20 | | | 80:20 | | |
| Mud Weight, ppg | 13.0 | | | 13.0 | | | 13.0 | | |
| Rheo Temp, ° F. | 40 | 100 | 150 | 40 | 100 | 150 | 40 | 100 | 150 |
| 600 rpm | 157 | 74 | 55 | 110 | 91 | 63 | 150 | 94 | 63 |
| 300 rpm | 89 | 44 | 35 | 68 | 56 | 41 | 89 | 54 | 37 |
| 200 rpm | 65 | 34 | 26 | 50 | 43 | 32 | 58 | 38 | 28 |
| 100 rpm | 40 | 22 | 18 | 34 | 28 | 23 | 30 | 21 | 16 |
| 6 rpm | 13 | 10 | 10 | 14 | 12 | 12 | 5 | 5 | 5 |
| 3 rpm | 12 | 10 | 10 | 13 | 11 | 11 | 5 | 4 | 4 |
| PV, cps | 68 | 30 | 20 | 42 | 35 | 22 | 61 | 40 | 26 |
| YP, lbs/100 ft$^2$ | 21 | 14 | 15 | 26 | 21 | 19 | 28 | 14 | 11 |
| 10 Second Gel | 12 | 15 | 13 | 23 | 23 | 22 | 6 | 4 | 7 |
| 10 Minute Gel | 34 | 31 | 30 | 39 | 36 | 32 | 24 | 21 | 15 |
| HTHP @ 250° F., ml | 4.2 | | | 6.8 | | | 5.4 | | |
| E.S., Vts @ 120° F. | 398 | | | 523 | | | 798 | | |

TABLE 9

Rheology After Dynamic (Rolling) Heat Aging at 150° F. for 16 hours with 3% wgt additional drill solids

| Mud Properties | API Barite | | | Barite A | | | Barite C | | |
|---|---|---|---|---|---|---|---|---|---|
| Oil:Water Ratio | 80:20 | | | 80:20 | | | 80:20 | | |
| Mud Weight, ppg | 13.0 | | | 13.0 | | | 13.0 | | |
| Rheo Temp, ° F. | 40 | 100 | 150 | 40 | 100 | 150 | 40 | 100 | 150 |
| 600 rpm | 173 | 82 | 57 | 131 | 106 | 72 | 152 | 98 | 65 |

TABLE 9-continued

Rheology After Dynamic (Rolling) Heat Aging at 150° F.
for 16 hours with 3% wgt additional drill solids

| Mud Properties | API Barite | | | Barite A | | | Barite C | | |
|---|---|---|---|---|---|---|---|---|---|
| 300 rpm | 95 | 48 | 34 | 78 | 63 | 44 | 88 | 53 | 36 |
| 200 rpm | 69 | 36 | 26 | 54 | 47 | 34 | 50 | 37 | 26 |
| 100 rpm | 42 | 23 | 19 | 34 | 31 | 24 | 27 | 20 | 15 |
| 6 rpm | 11 | 10 | 10 | 14 | 12 | 11 | 5 | 3 | 3 |
| 3 rpm | 11 | 9 | 9 | 13 | 11 | 11 | 4 | 3 | 3 |
| PV, cps | 77 | 34 | 23 | 53 | 43 | 28 | 64 | 45 | 29 |
| YP, lbs/100 ft$^2$ | 19 | 14 | 11 | 25 | 20 | 16 | 24 | 8 | 7 |
| 10 Second Gel | 12 | 12 | 13 | 21 | 20 | 22 | 4 | 3 | 4 |
| 10 Minute Gel | 38 | 32 | 30 | 34 | 37 | 33 | 29 | 23 | 27 |
| HTHP @ 250° F., ml | | 5.0 | | | 8.0 | | | 7.0 | |
| E.S., Vts @ 120° F. | | 404 | | | 600 | | | 705 | |

A sample of each initial mud formulation was contaminated with an additional 3% drill solids mixed on a Hamilton Beach mixer. The simulated drill solids used were from Petrohunt, Marcantal #1-LM# 20043541. The solids were ground up and used in lieu of lab contaminates such as Rev Dust or OCMA Clay. These fluids were subjected static heat aging at 150 F for 16 hours. The following Table 10 provides exemplary rheological data for each mud formulation.

TABLE 10

After Static Heat Aging at 250° F. for 16 hours

| Mud Properties | API | Barite A | Barite C |
|---|---|---|---|
| Oil:Water Ratio | 80:20 | 80:20 | 80:20 |
| Mud Weight, ppg | 13.0 | 13.0 | 13.0 |
| Rheo Temp, ° F. | 150 | 150 | 150 |
| 600 rpm | 49 | 43 | 47 |
| 300 rpm | 30 | 28 | 30 |
| 200 rpm | 22 | 21 | 22 |
| 100 rpm | 15 | 15 | 14 |
| 6 rpm | 8 | 8 | 5 |
| 3 rpm | 8 | 8 | 5 |
| PV, cps | 19 | 15 | 17 |
| YP, lbs/100 ft$^2$ | 11 | 13 | 13 |
| 10 Second Gel | 11 | 15 | 5 |
| 10 Minute Gel | 26 | 24 | 11 |

The variation in the mud weight (ΔMW) for the statically aged drilling fluid was measured by carefully extracting samples of the fluid from the top, middle and bottom of the static fluid. The following Table 11 provides exemplary results.

TABLE 11

Variation In The Mud Weight (ΔMW) For
The Statically Aged Drilling Fluid

| ΔMW- Static | API | Barite A | Barite C |
|---|---|---|---|
| Top, ppg | 12.92 | 13.0 | 13.01 |
| Middle, ppg | 13.12 | 13.12 | 13.10 |
| Bottom, ppg | 14.2 | 13.21 | 13.20 |

Upon review of the above data, one of skill in the art should understand and appreciate that a useful wellbore fluid can be formulated using a sized barite weighting agent that has a particle size distribution well below the API standard. It should also be appreciated that by controlling the particle size distribution of the barite weighting agent of the present disclosure, rheology can be controlled and a useful wellbore fluid can be formulated which is in direct contrast to the teachings of the prior art. Further, it has been unexpectedly found that drilling fluids formulated with the sized barite weighting agent of the present disclosure do not exhibit the dynamic and static sag properties present in fluids formulated with API grade barite.

One of skill in the art of drilling or other wellbore fluid formulation will appreciate that it has been the general understanding that decreasing the particle size in weighting agents leads to a corresponding increase in viscosity, which is undesirable in the industry. This was shown in the above example with a paste forming when using size Barite B. However, as supported by the above data, the use of sized barite weighting agent as disclosed herein does not in fact lead to any appreciable difference in rheological properties from those obtained with coarser ground weighting agents. And in fact, as supported by the above data, the use of sized weighting agent results in substantial and observable improvements in both the static and dynamic sag potentials of a wellbore fluid.

In view of the above disclosure, a person skilled and knowledgeable in the art of drilling fluids should understand and appreciate that one illustrative embodiment of the present disclosure is a drilling fluid comprising a fluid phase and a solid phase weight material for increasing the density of the drilling fluid in which the weight material is a ground particulate material and has a particle size distribution of at least 50% by weight particles in the range of about 1 μm to about 5 μm and at least 90% by weight particles in the range of about 4 μm to about 8 μm. In one preferred embodiment of the illustrative fluid the solid phase weight material is selected from the group including barite, calcite, hematite, ilmenite or combinations thereof and other similar material well know to one of skill in the art. The exemplary drilling fluid may be formulated such that the fluid phase is an oleaginous fluid selected from diesel oil, mineral oil, synthetic oil such as polyolefins or isomerized polyolefins, ester oils, glycerides of fatty acids, aliphatic esters, aliphatic ethers, aliphatic acetals, and combinations thereof and other similar material well know to one of skill in the art. Alternatively, the illustrative drilling fluid is formulated to include a fluid phase that is an invert emulsion in which the continuous phase is an oleaginous fluid selected from diesel oil, mineral oil, synthetic oil such as polyolefins or isomerized polyolefins, ester oils, glycerides of fatty acids, aliphatic esters, aliphatic ethers, aliphatic acetals, and combinations thereof and other similar material well know to one of skill in the art; and the discontinuous phase is a non-oleaginous fluid selected from fresh water, seawater, brine containing inorganic or organic dissolved salts, aqueous solutions containing water-miscible organic compounds and mixtures of these and other similar material well know to one of skill in the art. Additional additives such as those selected from additives for filtration control, additives for high temperature pressure control, additives for rheology control and combinations thereof and other similar material well know to one of skill in the art, may optionally be included in the illustrative drilling fluid. A unique characteristic of the illustrative drilling fluid is that when the drilling fluid is used in drilling operation such that sag is eliminated or avoided.

Another illustrative drilling fluid comprising a fluid phase and a solid phase weight material for increasing the density of the drilling fluid, wherein the weight material is a ground particulate material and has a particle size distribution such that: particles having a diameter less than 1 μm are 0 to 15% by volume; particles having a diameter between 1 μm and 4 μm are 15 to 40% by volume; particles having a diameter between 4 μm and 8 μm are 15 to 30 by volume; particles having a diameter between 8 μm and 12 μm are 5 to 15% by volume; particles having a diameter between 12 μm and 16 μm are 3 to 7% by volume; particles having a diameter between 16 μm and 20 μm are 0 to 10% by volume; particles having a diameter greater than 20 μm are 0 to 5% by volume. A third illustrative drilling fluid is formulated to include a fluid phase and a solid phase weight material for increasing the density of the drilling fluid, wherein the solid phase weight material is a ground particulate material and has a cumulative volume particle distribution such that <10% is less than 1 μm; <25% is in the range of 1 μm to 3 μm; <50% is in the range of 2 μm to 6 μm; <75% is in the range of 6 μm to 10 μm; <90% is in the range of 10 μm to 24 μm. In both the two preceding illustrative fluids, the solid phase weight material is selected from barite, calcite, hematite, ilmenite or combinations thereof, but is preferably barite. Optionally the fluid phase of the illustrative drilling fluids may be an oleaginous fluid selected from diesel oil, mineral oil, synthetic oil such as polyolefins or isomerized polyolefins, ester oils, glycerides of fatty acids, aliphatic esters, aliphatic ethers, aliphatic acetals, and combinations thereof and other similar material well know to one of skill in the art.

The present disclosure also encompasses a method of drilling a subterranean well utilizing a drilling fluids as substantially described herein. In one such illustrative embodiment, conventional rotary drilling operation are carried out utilizing a drilling fluid that is formulated to include a fluid phase and a solid phase weight material for increasing the density of the drilling fluid, wherein the weight material is a particulate material and has a particle size distribution of at least 50% by weight particles in the range of about 1 μm to about 5 μm and at least 90% by weight particles in the range of about 4 μm to about 8 μm. The method is preferably carried out using a the solid phase weight material selected from barite, calcite, hematite, ilmenite or combinations thereof. and other similar material well know to one of skill in the art, but preferably the solid phase weighting material is barite.

It should also be appreciated that the present disclosure encompasses a method of drilling a subterranean well utilizing a drilling fluid, wherein the drilling fluid is formulated to include a fluid phase and a solid phase weight material for increasing the density of the drilling fluid, wherein the weight material is a particulate material and has a particle size distribution such that: particles having a diameter less than 1 μm are 0 to 15% by volume; particles having a diameter between 1 μm and 4 μm are 15 to 40% by volume; particles having a diameter between 4 μm and 8 μm are 15 to 30 by volume; particles having a diameter between 8 μm and 12 μm are 5 to 15% by volume; particles having a diameter between 12 μm and 16 μm are 3 to 7% by volume; particles having a diameter between 16 μm and 20 μm are 0 to 10% by volume; particles having a diameter greater than 20 μm are 0 to 5% by volume. Alternatively the present disclosure encompasses an illustrative embodiment in which a method of drilling a subterranean well utilizing a drilling fluid, wherein the drilling fluid comprises a fluid phase and a solid phase weight material for increasing the density of the drilling fluid, wherein the solid phase weight material is particulate and has a cumulative volume particle distribution such that <10% is less than 1 μm; <25% is in the range of 1 μm to 3 μm; <50% is in the range of 2 μm to 6 μm; <75% is in the range of 6 μm to 10 μm; <90% is in the range of 10 μm to 24 μm.

In addition, one of skill in the art should appreciate that a method of increasing the density of a fluid phase of a drilling fluid is also an illustrative embodiment of the present disclosure. One such illustrative includes adding to the fluid phase of the drilling fluid a solid phase weight material for increasing the density of the drilling fluid, wherein the solid phase weight material is a particulate material and has a particle size distribution of at least 50% by weight particles in the range of about 1 μm to about 5 μm and at least 90% by weight particles in the range of about 4 μm to about 8 μm. Alternatively, the illustrative method may involve increasing the density of the drilling fluid, wherein the solid phase weight material is particulate material and has a particle size distribution such that: particles having a diameter less than 1 μm are 0 to 15% by volume; particles having a diameter between 1 μm and 4 μm are 15 to 40% by volume; particles having a diameter between 4 μm and 8 μm are 15 to 30 by volume; particles having a diameter between 8 μm and 12 μm are 5 to 15% by volume; particles having a diameter between 12 μm and 16 μm are 3 to 7% by volume; particles having a diameter between 16 μm and 20 μm are 0 to 10% by volume; particles having a diameter greater than 20 μm are 0 to 5% by volume. Yet a third variation to the disclosed illustrative methods is a method of increasing the density of a fluid phase of a drilling fluid, the method comprising adding to the fluid phase of the drilling fluid a solid phase weight material for increasing the density of the drilling fluid, wherein the solid phase weight material is particulate material and has a cumulative volume particle distribution such that: <10% is less than 1 μm; <25% is in the range of 1 μm to 3 μm; <50% is in the range of 2 μm to 6 μm; <75% is in the range of 6 μm to 10 μm; <90% is in the range of 10 μm to 24 μm.

All of the methods and compositions disclosed and claimed herein can be made and executed without undue experimentation in light of the present disclosure. While the methods and compositions disclosed herein have been described in terms of preferred embodiments, it will be apparent to those of skill in the art that variations may be applied to the methods, and in the steps or in the sequence of steps of the methods described herein and to the compositions and in the components of the compositions described herein. More specifically, it will be apparent that certain agents which are both chemically and physiologically related may be substituted for the agents described herein while the same or similar results would be achieved. All such similar substitutes and modifications apparent to those skilled in the art are deemed to be within the scope and concept of the claimed subject matter as defined by any appended claims.

What is claimed is:

1. A method of drilling a subterranean well utilizing a drilling fluid, wherein the drilling fluid comprises a fluid phase and a solid phase weight material for increasing the density of the drilling fluid, wherein the weight material is a ground particulate material and has a particle size distribution such that: particles having a diameter less than 1 µm are 0 to 15% by volume; particles having a diameter between 1 µm and 4 µm are 15 to 40% by volume; particles having a diameter between 4 µm and 8 µm are 15 to 30% by volume; particles having a diameter between 8 µm and 12 µm are 5 to 15% by volume; particles having a diameter between 12 µm and 16 µm are 3 to 7% by volume; particles having a diameter between 16 µm and 20 µm are 0 to 10% by volume; particles having a diameter greater than 20 µm are 0 to 5% by volume.

2. The method of claim 1, wherein the solid phase weight material is selected from the group consisting of barite, calcite, hematite, ilmenite or combinations thereof.

3. The method of claim 1, wherein the solid phase weighting material is barite.

4. The method of claim 1, wherein the fluid phase is an oleaginous fluid selected from the group consisting of diesel oil, mineral oil, synthetic oil such as polyolefins or isomerized polyolefins, ester oils, glycerides of fatty acids, aliphatic esters, aliphatic ethers, aliphatic acetals, and combinations thereof.

5. The method of claim 1, wherein the fluid phase is an invert emulsion in which the continuous phase is an oleaginous fluid selected from the group consisting of diesel oil, mineral oil, synthetic oil such as polyolefins or isomerized polyolefins, ester oils, glycerides of fatty acids, aliphatic esters, aliphatic ethers, aliphatic acetals, and combinations thereof; and the discontinuous phase is a non-oleaginous fluid selected from the group consisting of fresh water, seawater, brine containing inorganic or organic dissolved salts, aqueous solutions containing water-miscible organic compounds and mixtures of these.

6. The method of claim 1, wherein the drilling fluid firther comprises at least one additional additive selected from the group consisting of additives for filtration control, additives for high temperature pressure control, additives for rheology control and combinations thereof.

7. The method of claim 1, wherein the drilling fluid is used in drilling operation such that sag is eliminated or avoided.

* * * * *